Oct. 23, 1934.  B. KLEIN  1,977,796

DISPENSING CONTAINER

Filed Feb. 19, 1934

INVENTOR
Benjamin Klein
BY
Pennie, Davis, Marvin & Edmonds
HIS ATTORNEYS

Patented Oct. 23, 1934

1,977,796

UNITED STATES PATENT OFFICE 1,977,796

DISPENSING CONTAINER

Benjamin Klein, Long Island City, N. Y., assignor to Small, Kleppner & Seiffer, Inc., New York, N. Y., a corporation of New York Application February 19, 1934, Serial No. 711,898

10 Claims. (Cl. 221—62)

This invention relates to dispensing containers and more particularly concerns a measuring and dispensing closure construction for containers carrying substances in powder, granular or other fluid or semi-fluid form.

It is customary to market substances such as tooth powder, powdered soap and other powdered or granular material in cans or containers having closable openings therein through which the substance is poured for use. In the past, such containers have been unsatisfactory for various reasons. Thus where it is desired to use only a small measured quantity of the substance at a time, as is the case with tooth powder, powdered shaving soap, cleansing powder and like materials, the user has great difficulty in limiting the flow of material to the amount required, with the consequence that considerable material is scattered about and the pouring procedure is messy and wasteful. This difficulty is aggravated by the fact that powdered materials tend to pack and stick in the passages or openings of the container, making it necessary to shake or tap the container to inititate the flow of powder, and usually under these conditions where the flow is so started, an excessive amount of the powder is discharged before the flow can be cut off. Also, the user often neglects to replace the container closure after use, and the material either cakes or hardens in the container, or, if it remains fluid, is spilled if the container is accidentally inverted.

With the above and other considerations in mind, it is proposed in accordance with the present invention to provide an improved dispensing container having a self-closing opening which may be conveniently operated with one hand, and which acts to dispense a measured quantity of the container contents each time it is operated. It is a further object of the invention to provide a container of the type described which is simple in construction and inexpensive to manufacture and which incorporates means for locking the closure against accidental opening when the container is not in use.

In general, the above and other objects of my invention are carried out by providing a hollow duct or extension communicating with the interior of the container and providing a closure member slidably engaging and surrounding the exterior surface of the duct. Cooperating openings are provided in the duct and the closure member which openings may be brought into registry by sliding the closure member inwardly along the duct and a spring or equivalent means is employed to normally maintain the closure member in its outer position in which the openings are out of registry and the container accordingly closed. The duct is preferably open-ended while the closure member is closed at its outer end, and with this arrangement, the closure member in its inward movement acts somewhat in the nature of a piston to compress the powdered material and force a measured quantity out of the openings as they come into registry. In one form of my invention, I prefer to provide an inwardly extending lip or flange on the lower or inner edge of the duct opening, with the result that a measured quantity of the powder forced past this opening by movement of the closure member is plowed or deflected out of the container as the two openings come into registry. I may also employ a spring of such formation that it assists in expelling the desired quantity of material through the registering openings as this spring is compressed by movement of the closure member. As a desirable, although not essential, feature, I may further provide a releasable locking device for holding the closure member in its outer or locking position whereby accidental operation of the closure and spilling of the container contents may be avoided. This locking feature is particularly desirable when the container is carried in a handbag or otherwise when traveling.

The invention will be best understood by reference to the accompanying drawing in which one embodiment thereof has been illustrated. In the drawing.

Figure 4:
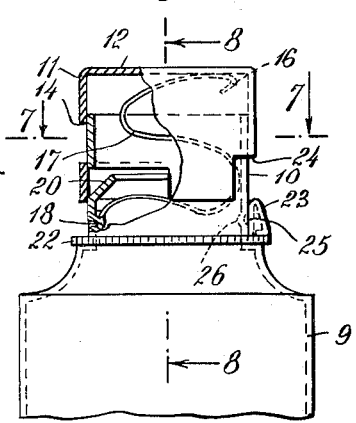
Figure 4 is an elevation, similar to Figure 3, with certain parts broken away to show the interior construction.
Figure 7:
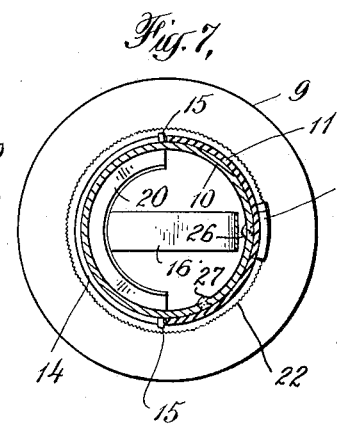
Figure 8:
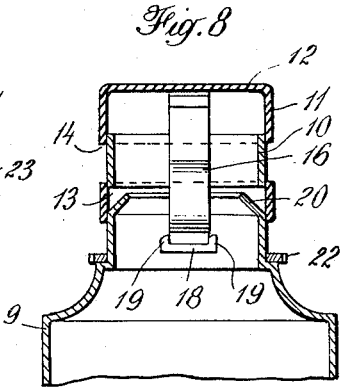

Figures 7 and 8 are respectively sectional views, taken along the lines 7—7 and 8—8 of Figure 4, and viewed in the direction of the arrows.

Referring to the drawing, I have illustrated my improved dispensing closure device in connection with a suitable cylindrical container 9 of conventional construction. In accordance with the invention, a hollow open-ended duct 10 is suitably secured to or formed integral with the container 9 in communication with the interior thereof at the upper end, and in the disclosed embodiment, this duct is cylindrical in form. A cylindrical closure member 11 having a closed outer end 12 is slidably supported on the outer surface of the duct 10 in such a manner that it is movable longitudinally toward and away from the container proper.

Figure 2:
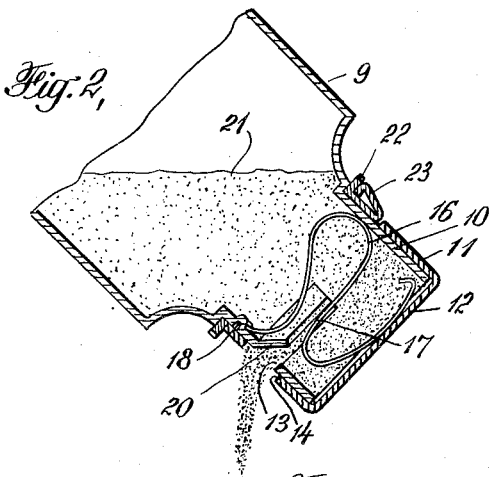
Figure 2 is a sectional view, similar to Figure 1, showing the dispensing closure in its operated position.
Figure 3:
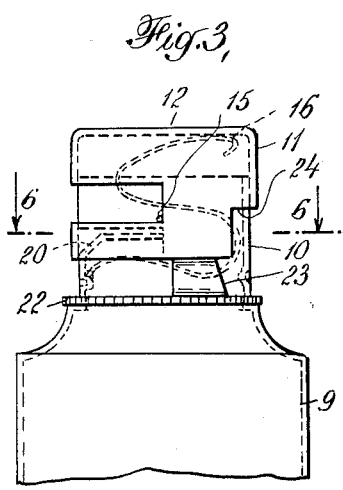
Figure 3 is an elevation of the container and closure of Figures 1 and 2, showing the closure in its closed position.
Figure 5:
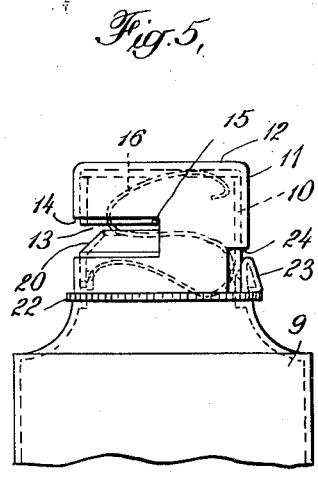
Figure 5 is an elevation of the device in its operated or open position.

An opening 13 is provided through the wall of the duct 10. Openings of various shapes and sizes may be used, but I have found that the opening 13 disclosed, which extends over substantially one-half the periphery of the duct 10, gives very satisfactory results. The height of the opening 13 longitudinally of the duct 10 is considerably less than the longitudinal extent of the duct 10 beyond the opening. An opening 14, similar in shape and peripheral extent to the opening 13, is formed in the wall of the closure member 11, this opening 14 being of slightly greater width or longitudinal dimension than the opening 13, as shown in Figures 2 and 5. Any suitable means may be provided for limiting the movement of the closure member 11 on the duct 10, and as shown, two pins 15 are fixed to the duct 10 just above the opening 13 and respectively extending through the opening 14 in the closure member 11 adjacent the peripheral extremities of this opening, as shown in Figures 3, 5 and 7. The pins 15 not only limit the longitudinal opening of the closure 11 but also prevent rotation thereof about the duct 10 so that the openings 13 and 14 always come into registry when the closure member 11 is depressed.

Any suitable type of spring may be used to normally maintain the closure member 11 in its outer closed position. In accordance with one embodiment of my invention, I prefer to employ for this purpose a spring which aids in ejecting material from the container. Thus I have shown a flat spring 16 bent in substantial S formation and having a downwardly disposed surface 17 which is directed toward and disposed above the duct opening 13 when the closure member is in its outer closed position. The lower end of the spring 16 may be supported within the duct 10 in any suitable manner, and as shown, this spring end may rest upon a horizontal ledge 18 between two vertical ridges 19, the ledge and ridges being conveniently pressed inwardly from the metal of the duct 10. The upper spring end rests on the inner surface of the closed outer end 12 of the closure member 11. As shown in Figures 1, 2, 4 and 5, when the closure member 11 is depressed, the flat spring 16 is compressed and the surface 17 thereof moves toward the opening 13 in the duct 10 at the same time that this opening is uncovered by the opening 14 in the closure member 11.

I prefer to provide means adjacent the opening 13 and within the duct 10 for deflecting the material moved along the duct out of the opening and for this purpose, I have disclosed an inwardly extending angularly disposed lip or flange 20 formed integrally with the lower edge of the opening 13. This lip 20 extends along the entire lower edge of the opening 13 and slants inwardly therefrom toward the outer end of the duct 10, as shown.

Figure 1:
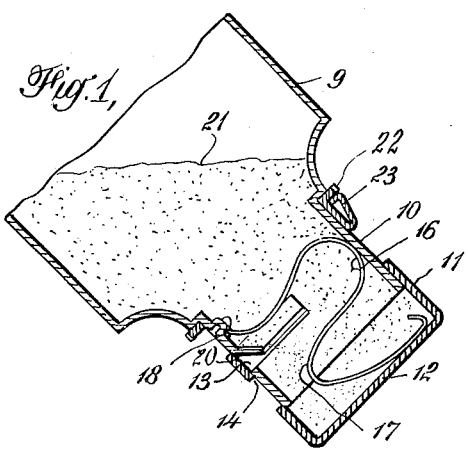
Figure 1 is a sectional side view of a container equipped with a dispensing closure embodying the invention, the container being disposed in position for use.

In operating my improved dispensing closure device, the container 9 is first inverted so that the powder or other material 21 carried thereby flows into and fills the duct 10 and the outer end of the closure member 11, as shown in Figure 1. The user then presses the closure member 11 inwardly along the duct 10 and the closed outer end of this member acts as a piston and moves the powder along the duct toward the inner end thereof. At the same time, the opening 14 comes into registry with the opening 13, and a limited quantity of the powder is expelled from the container. The expulsion of the powder is actually caused by three things. First, as the end 12 of the closure member 11 moves the powder along the duct 10, this movement is resisted by the friction between the powder and the duct surfaces and the powder is accordingly compressed and forced out of the openings 13 and 14 as they come into registry. Second, the lip or flange 20 plows out or diverts through the opening a predetermined quantity of the powder as it is moved inwardly through the duct 10 by the piston action of the closure member 11. Thirdly, as the closure member 11 is moved inwardly, the spring 16 is compressed and the surface 17 thereof moves toward the openings and propels a quantity of the powdered material out of the openings 13 and 14. Either the flat spring feature or the lip-diverting feature or both may be omitted without departing from the invention in its broadest aspects. However, I prefer to use the lip or flange, and the flat spring is also desirable in many cases.

It will be readily apparent that each time the closure member 11 is depressed, a predetermined amount of the powdered contents of the container is expelled. The amount of material dispensed upon each operation of the closure member depends primarily upon the amount of longitudinal movement of the closure member along the duct 10, and this may be regulated within limits by the user. After the closure member has completed its inward movement and is stationary, no more powdered material flows from the device and this for the reason that the path of travel from the container 9 through the openings 13 and 14 is quite circuitous, including a reversal of direction of travel, and with this arrangement, the friction between the material and the passages effectively prevents further flow of the powder. The flat spring 16, when employed, aids in thus cutting off the flow of powder after the movement of the closure member is completed, since the flat surfaces of the spring obstruct the path of the powder to a degree. In this manner, the wasteful and untidy discharge of unnecessarily large quantities of the powder is effectively prevented.

Figure 6:
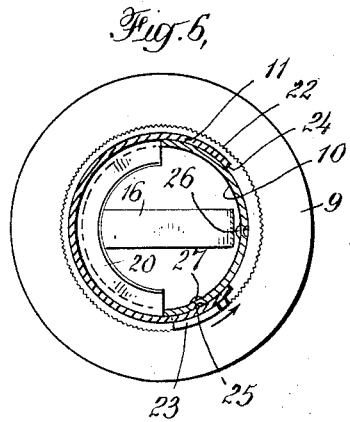
Figure 6 is a sectional view, taken along the line 6—6 of Figure 3.

In order to prevent the accidental operation of my improved dispensing container closure, particularly when carried in a handbag or the like, I may provide locking means for rigidly holding the closure member 11 in its outer or closed position. For this purpose, I have shown a ring shaped member 22 rotatably carried by and surrounding the duct 10 adjacent its inner end, together with an upwardly disposed stop or detent 23 carried by the ring. A recess 24 of considerably greater peripheral extent than that of the detent 23 is formed in the lower edge of the cylindrical wall of the closure member 11, preferably at a point substantially opposite the center of the opening 14. When the ring 22 is turned to such a position that the detent 23 is aligned with the recess 24, the closure member 11 may be freely depressed in the manner described above. If it is desired to lock the closure, the ring 22 is rotated until the detent 23 is moved out of alignment with the recess 24, whereupon longitudinal movement of the closure member 11 along the duct 10 is positively prevented by the engagement of the lower edge of the closure member 11 with the upper edge of the detent 23. The detent 23 has been shown in its locked position in Figure 6 and in its open position in Figure 7. I prefer to provide suitable means for releasably fixing the ring 22 carrying the detent 23 in its locked and open positions and in the disclosed embodiment, a lug or extension 25 is provided on the inner surface of the detent 23 and is arranged to snap into and releasably engage with two depressions 26 and 27 formed in the cylindrical surface of the duct 10 at the open and locked positions of the detent respectively. The detent 23 may be formed in any suitable manner and as shown, may comprise a strip of metal integral with the inner edge of the ring 22 and bent upon itself as shown in Figures 1 and 2, so as to form a closed and rigid structure.

I claim:

1. In a device of the class described, in combination with a container, an open-ended duct secured to and communicating with the interior of the container and having an opening in the wall thereof, a closure member slidably engaging the outer surface of said duct and having an opening in the wall thereof movable into registry with said opening in the wall of said duct when said closure member is moved inwardly along said duct, said closure member having a closed outer end extending across the open outer end of said duct, and resilient means for normally holding said closure member in its outer closed position.

2. In a device of the class described, in combination with a container, a cylindrical duct secured to said container in communication with the interior thereof and having an open outer end and an opening in the cylindrical wall thereof adjacent its inner end, a cylidrical closure member surrounding and slidably engaging the outer surface of said duct and having an opening in the cylindrical wall thereof disposed to register with said opening in the cylindrical wall of said duct when said closure member is moved adjacent the inner end of said duct, resilient means for normally holding said closure member adjacent the outer end of said duct with said cylindrical wall openings out of registry, and a closed outer end on said closure member for forcing material inwardly through said duct when said closure member is moved inwardly along said duct.

3. In a device of the class described, in combination with a container, a duct secured in communication with the interior of said container and having an open outer end and an opening in its wall adjacent the inner end thereof, a closure member slidably engaging the outer surface of said duct and having a closed outer end and an opening in the wall thereof movable into registry with said duct wall opening when said closure member is moved inwardly on said duct, means for limiting the movement of said closure member along said duct and resilient means engaging said closure member for normally holding said closure member in its outer closed position.

4. In a device of the class described, in combination with a container, a cylindrical duct secured to said container in communication with the interior thereof and having an open outer end and an opening in the cylindrical wall thereof adjacent its inner end, a cylindrical closure member surrounding and slidably engaging the outer surface of said duct and having an opening in the cylindrical wall thereof disposed to register with said opening in the cylindrical wall of said duct when said closure member is moved adjacent the inner end of said duct, resilient means for normally holding said closure member adjacent the outer end of said duct with said cylindrical wall openings out of registry, means on said duct extending through said opening in said closure member for limiting the longitudinal movement of said closure member on said duct, and a closed outer end on said closure member for closing the outer end of said duct and for forcing material inwardly through said duct when said closure member is moved inwardly along said duct.

5. In a device of the class described, in combination with a container, an outwardly extending duct secured in communication with the interior of said container and having an open outer end and an opening in its wall, a closure member having a wall portion surrounding and slidably engaging the outer surface of said duct wall and having an end portion extending across and enclosing the open outer end of said duct, said closure member having an opening in the wall thereof movable into registry with said opening in said duct wall when said closure member is moved inwardly along said duct and a lip on the inner edge of the duct wall opening, extending into the interior of said duct, for diverting material out of said duct wall opening when said closure member is moved inwardly along said duct.

6. In a device of the class described, in combination with a container, an outwardly extending duct secured in communication with the interior of said container and having an open outer end and an opening in its wall, a closure member having a wall portion surrounding and slidably engaging the outer surface of said duct wall and having an end portion extending across and enclosing the open outer end of said duct, said closure member having an opening in the wall thereof movable into registry with said opening in said duct wall when said closure member is moved inwardly along said duct and an angularly disposed lip on the inner edge of said duct wall opening, extending into the interior of said duct and toward the outer end thereof, for diverting material through said duct wall opening when such material is moved inwardly through said duct by the inward movement of said closure member.

7. In a device of the class described, in combination with a container, an outwardly extending duct secured in communication with the interior of said container and having an open outer end and an opening in its wall, a closure member having a wall portion surrounding and slidably engaging the outer surface of said duct wall and having an end portion extending across and enclosing the open outer end of said duct, said closure member having an opening in the wall thereof movable into registry with said opening in said duct wall when said closure member is moved inwardly along said duct, means for limiting the outward movement of said closure member along said duct and a spring engaging said closure member and said duct for normally holding said closure member in its outer closed position, said spring having a surface thereon which moves toward said duct wall opening when said closure member is moved inwardly along said duct.

8. In a device of the class described, in combination with a container, an outwardly extending duct secured in communication with the interior of said container and having an open outer end and an opening in its wall, a closure member having a wall portion surrounding and slidably engaging the outer surface of said duct wall and having an end portion extending across and enclosing the open outer end of said duct, said closure member having an opening in the wall thereof movable into registry with said opening in said duct wall when said closure member is moved inwardly along said duct, means for limiting the movement of said closure member along said duct and a flat compressed spring having opposite ends respectively engaging said closure member and said duct and having a surface movable toward said duct wall opening when said closure member is moved inwardly along said duct.

9. In a device of the class described, in combination with a container, an outwardly extending duct secured in communication with the interior of said container and having an open outer end and an opening in its wall, a closure member having a wall portion surrounding and slidably engaging the outer surface of said duct wall and having an end portion extending across and enclosing the open outer end of said duct, said closure member having an opening in the wall thereof movable into registry with said opening in said duct wall when said closure member is moved inwardly along said duct, a lip on the inner edge of said duct wall opening extending into the interior of said duct for diverting material out of said duct wall opening when said closure member is moved inwardly along said duct, means for limiting the outward movement of said closure member along said duct and a spring engaging said closure member and said duct for normally holding said closure member in its outer closed position, said spring having a surface thereon which moves toward said duct wall opening when said closure member is moved inwardly along said duct.

10. In a device of the class described, in combination with a container, an outwardly extending duct communicating with the interior of said container, a closure member having a closed outer end fixed to and slidable longitudinally along said duct, said duct and said closure member having openings in the side walls thereof which register to form a container opening when said closure member is moved to an inward position on said duct, a recess in the inner edge of the side wall of said closure member, a ring surrounding said duct adjacent said inner end and a detent on said ring extending outwardly along the duct wall and movable with said ring into alignment with said closure member recess to permit inward movement of said closure member, and movable with said ring to a position out of alignment with said recess to prevent inward movement of said closure member and thereby lock said closure member in its outer closed position.

BENJAMIN KLEIN.